US011381153B1

(12) United States Patent
Xiong et al.

(10) Patent No.: US 11,381,153 B1
(45) Date of Patent: Jul. 5, 2022

(54) METHOD TO BALANCE THE SECONDARY WINDING CURRENT TO IMPROVE THE CURRENT CONTROL STABILITY

(71) Applicant: Universal Lighting Techologies, Inc., Madison, AL (US)

(72) Inventors: Wei Xiong, Madison, AL (US); Dane Sutherland, Madison, AL (US)

(73) Assignee: Universal Douglas Lighting America, Madison, AL (US)

( * ) Notice: Subject to any disclaimer, the term of this patent is extended or adjusted under 35 U.S.C. 154(b) by 0 days.

(21) Appl. No.: 16/988,790

(22) Filed: Aug. 10, 2020

Related U.S. Application Data

(60) Provisional application No. 62/896,648, filed on Sep. 6, 2019.

(51) Int. Cl.
| | |
|---|---|
| *H02M 1/14* | (2006.01) |
| *H05B 45/382* | (2020.01) |
| *H05B 45/35* | (2020.01) |
| *H02M 3/00* | (2006.01) |
| *H02M 3/335* | (2006.01) |
| *H02M 1/00* | (2006.01) |

(52) U.S. Cl.
CPC .............. *H02M 1/14* (2013.01); *H02M 3/01* (2021.05); *H02M 3/33571* (2021.05); *H05B 45/35* (2020.01); *H05B 45/382* (2020.01); *H02M 1/0009* (2021.05); *H02M 1/0025* (2021.05)

(58) Field of Classification Search
CPC .... H02M 1/14; H02M 1/0009; H02M 1/0025; H02M 3/01; H02M 3/33571; H05B 45/35; H05B 45/382
See application file for complete search history.

(56) References Cited

U.S. PATENT DOCUMENTS

| | | |
|---|---|---|
| 4,349,752 A | 9/1982 | Forte |
| 5,696,431 A | 12/1997 | Giannopoulos et al. |
| 5,864,472 A | 1/1999 | Peterson |

(Continued)

OTHER PUBLICATIONS

International Rectifier: Datasheet for IRS27951S amd IRS27952(4)S, Aug. 27, 2015, 29 pages.

*Primary Examiner* — Jue Zhang
(74) *Attorney, Agent, or Firm* — Patterson Intellectual Property Law, P.C.

(57) ABSTRACT

A power converter and method for improving the current control stability of power converter by balancing the secondary winding currents is provided herein. The power converter includes a primary circuit having switches controllably driven at an operating frequency to produce an AC output through a primary transformer winding, and a secondary circuit having first and second secondary windings having respective leakage inductances. The secondary circuit provides power at an output node based on a power transfer between the primary winding and the first and second secondary windings. At least one balance inductor is coupled in series with the first and second secondary windings, and configured to reduce a difference between the first leakage inductance and the second leakage inductance. The at least one balance inductor may further be configured to reduce a difference between first and second AC current peaks associated with the first and second secondary windings, respectively.

9 Claims, 7 Drawing Sheets

(56) References Cited

U.S. PATENT DOCUMENTS

| | | |
|---|---|---|
| 7,595,969 B2 | 9/2009 | Oba |
| 7,843,141 B1 | 11/2010 | Xiong et al. |
| 8,057,652 B2 | 11/2011 | Routbort et al. |
| 8,193,738 B2 | 6/2012 | Chu et al. |
| 8,269,423 B2 | 9/2012 | Yao et al. |
| 8,692,475 B2 | 4/2014 | Wang |
| 9,112,415 B2 | 8/2015 | Grakist et al. |
| 9,237,613 B1 | 1/2016 | Xiong et al. |
| 9,326,332 B1 | 4/2016 | Melanson |
| 9,585,210 B2 | 2/2017 | Bandel |
| 9,730,281 B2 | 8/2017 | Bannister |
| 9,837,913 B1 | 12/2017 | Xiong |
| 10,098,194 B1 | 10/2018 | Xiong |
| 10,243,473 B1 | 3/2019 | Xiong et al. |
| 10,362,652 B1 | 7/2019 | Xiong et al. |
| 10,476,399 B1 | 11/2019 | Xiong |
| 10,483,864 B1 | 11/2019 | Xiong |
| 10,624,163 B1 | 4/2020 | Xiong |
| 10,743,382 B1 | 8/2020 | Xiong |
| 2004/0160794 A1 | 8/2004 | Lin |
| 2010/0149838 A1 | 6/2010 | Artusi et al. |
| 2010/0277957 A1 | 11/2010 | Chueh et al. |
| 2011/0205764 A1* | 8/2011 | Sheng ............... H02M 3/33592 363/20 |
| 2012/0026759 A1 | 2/2012 | Balakrishnan et al. |
| 2012/0153858 A1 | 6/2012 | Melanson et al. |
| 2012/0274291 A1* | 11/2012 | Ge ..................... H05B 45/37 323/267 |
| 2013/0099788 A1 | 4/2013 | Xu et al. |
| 2013/0271021 A1 | 10/2013 | Elferich |
| 2013/0300310 A1 | 11/2013 | Hu |
| 2014/0091720 A1 | 4/2014 | Brinlee |
| 2014/0152187 A1 | 6/2014 | Lin et al. |
| 2014/0167640 A1 | 6/2014 | Knoedgen |
| 2014/0252981 A1 | 9/2014 | Xie et al. |
| 2014/0346874 A1 | 11/2014 | Fang et al. |
| 2015/0042227 A1 | 2/2015 | Kumar et al. |
| 2015/0103562 A1 | 4/2015 | Yeh et al. |
| 2015/0195878 A1* | 7/2015 | Garrity ............... H05B 45/40 315/186 |
| 2015/0257222 A1 | 9/2015 | Siessegger et al. |
| 2016/0014858 A1 | 1/2016 | Ramabhadran et al. |
| 2016/0014863 A1 | 1/2016 | Sullivan et al. |
| 2016/0057825 A1 | 2/2016 | Hu et al. |
| 2016/0073457 A1 | 3/2016 | Nakajo |
| 2016/0190945 A1 | 6/2016 | Liu et al. |
| 2016/0276936 A1 | 9/2016 | Gritti |
| 2016/0366742 A1 | 12/2016 | Lee et al. |
| 2017/0093296 A1 | 3/2017 | Chen |
| 2017/0179831 A1 | 6/2017 | Yu et al. |
| 2017/0187298 A1 | 6/2017 | Lin |
| 2017/0222565 A1 | 8/2017 | Sonobe |
| 2017/0238380 A1 | 8/2017 | Bannister |
| 2017/0280523 A1 | 9/2017 | Kathiresan et al. |
| 2018/0054864 A1 | 2/2018 | Yang et al. |
| 2018/0153020 A1 | 5/2018 | Sun et al. |
| 2018/0234019 A1 | 8/2018 | Chen |
| 2018/0262118 A1 | 9/2018 | Ouyang |

* cited by examiner

METHOD TO BALANCE THE SECONDARY WINDING CURRENT TO IMPROVE THE CURRENT CONTROL STABILITY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit under 35 USC. § 119(e) of U.S. Provisional Patent Application No. 62/896,648, filed Sep. 6, 2019, entitled "Method to Balance the Secondary Winding Current to Improve the Current Control Stability."

FIELD OF THE INVENTION

The present disclosure relates generally to power converters that provide a constant DC output current to a load, such as, for example, light-emitting diodes. More particularly, the present disclosure relates to improving the current control stability of power converters using inductive balancing.

BACKGROUND

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs and to avoid current runaway and LED flickering. An important consideration in LED driver design is that the output current ripple must be within a certain tolerance to avoid overdriving current to the LEDs and visible flickering thereof.

Resonant type half-bridge DC-DC power converters are a very popular topology for use as an LED driver. This type of power converter has good stability and very wide range of operating frequencies. An issue with this type of power converter is that when the output current is high, for example, 2 A to a 45V LED load, the output current of the power converter will show an asymmetric high AC high frequency (HF) ripple which can affect feedback control stability and cause lower frequency LED output flickering.

BRIEF SUMMARY

Exemplary power converters, transformers, methods as disclosed herein may improve current control stability (e.g., feedback control loop stability) by adding inductors to help balancing the secondary winding currents and avoid flickering of the LED load.

One embodiment of a resonant power converter as disclosed herein comprises a primary circuit with one or more switching elements controllably driven at an operating frequency to produce an alternating current (AC) output through a primary winding of a transformer, and a secondary circuit with first and second secondary windings of the transformer. The first secondary winding has a first leakage inductance, the second secondary winding having a second leakage inductance, and the secondary circuit is configured to provide power at an output node based on a power transfer between the primary winding and the first and second secondary windings. At least one balance inductor is coupled in series with the first and second secondary windings, and configured to reduce a difference between the first leakage inductance and the second leakage inductance.

In an exemplary aspect of the above-referenced embodiment, the first secondary winding may have a first secondary winding current peak, and the second secondary winding may have a second secondary winding current peak, wherein the at least one balance inductor is configured to reduce a difference between the first AC current peak and the second AC current peak.

In another exemplary aspect of the above-referenced embodiment, an inductance of the at least one balance inductor is less than 10% of a primary inductance of the primary winding divided by a turns ratio between the primary winding and the first and second secondary windings squared.

In another exemplary aspect of the above-referenced embodiment, the first and second secondary windings are coupled together at a common node, and the at least one balance inductor comprises a single balance inductor coupled to the common node.

In another exemplary aspect of the above-referenced embodiment, the first and second secondary windings are coupled together at a common node, the at least one balance inductor includes a first balance inductor and a second balance inductor, the first balance inductor is coupled in series with the first secondary winding opposite the common node, and the second balance inductor is coupled in series with the second secondary winding opposite the common node.

In another exemplary aspect of the above-referenced embodiment, an inductance of the first balance inductor is less than 10% of a primary inductance of the primary winding divided by a first turns ratio between the primary winding and the first secondary windings squared, and an inductance of the second balance inductor is less than 10% of the primary inductance of the primary winding divided by a second turns ratio between the primary winding and the second secondary windings squared.

In another exemplary aspect of the above-referenced embodiment, the secondary circuit includes a first diode and a second diode, with each of the first and second diodes including an anode and a cathode, and the cathodes of the first and second diodes coupled to the output node of the secondary circuit. The first balance inductor is coupled between the first secondary winding and the anode of the first diode, and the second balance inductor is coupled between the second secondary winding and the anode of the second diode.

In another exemplary aspect of the above-referenced embodiment, the power converter is an LED driver and the load comprises one or more light emitting diodes (LEDs).

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
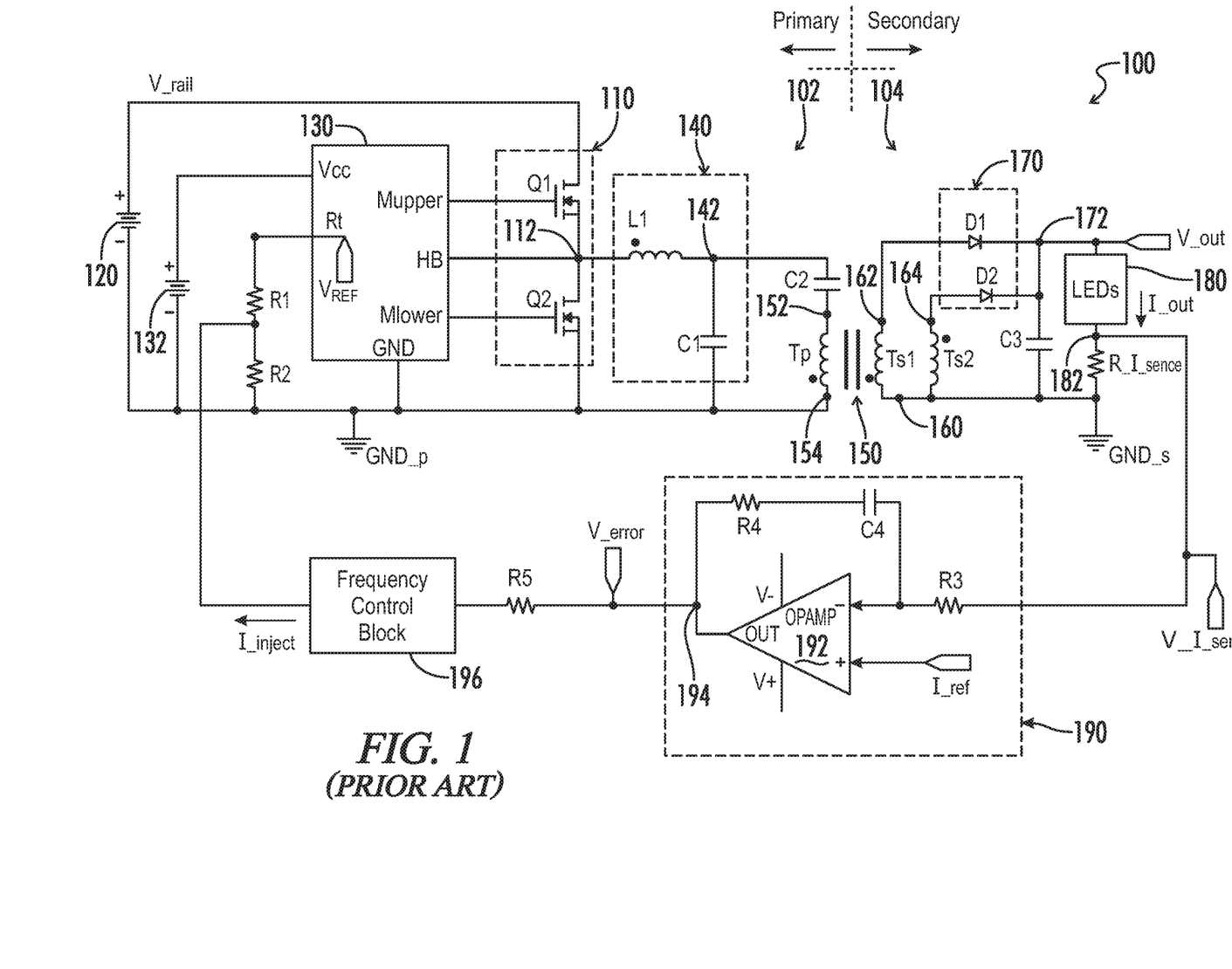
FIG. 1 is a circuit diagram representing a power converter (e.g., a half-bridge resonant type DC-DC converter) as disclosed herein.

Referring to FIG. 1, an embodiment of a half-bridge resonant type DC-DC converter 100 is shown. The half-bridge resonant type DC-DC converter 100 may also be referred to therein as a power converter 100 or LED driver 100. The power converter 100 includes a primary circuit 102 and a secondary circuit 104, which are electrically isolated as described below. The converter includes a first switch Q1 and a second switch Q2 in a half-bridge switching circuit 110. The switches (also referred to herein as "switching elements") may be, for example, metal oxide semiconductor field effect transistors (MOSFETs) or bipolar junction transistors (BJTs). In the illustrated embodiment, the two switches are n-channel MOSFETs. The half-bridge switching circuit is connected between a DC input bus V_rail and a primary circuit ground reference GND_p. The DC input bus may be considered as a first voltage rail; and the primary circuit ground reference may be considered as a second voltage rail. The drain of the first switch is connected to the DC input bus. The source of the first switch is connected to the drain of the second switch at a common switched node 112 of the half-bridge switching circuit. The source of the second switch is connected to the primary circuit ground reference.

In the illustrated embodiment, the voltage on the DC input bus V_rail is provided by a first DC voltage source 120. In the illustrated embodiment, the first DC voltage source is illustrated as a battery; however, it should be understood that the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch Q1 and the second switch Q2 has a respective control input terminal. In the illustrated embodiment incorporating MOSFETs, the control input terminals are the gates of the two transistors. The control input terminals are driven by a self-oscillating half-bridge gate driver integrated circuit (IC) 130, which may also be referred to as a switch controller. In the illustrated embodiment, the driver IC (switch controller) may be, for example, an NCP1392B high-voltage half-bridge driver with inbuilt oscillator, which is commercially available from ON Semiconductor Company of Phoenix, Ariz. The driver IC is powered by a second DC voltage source 132 via an input pin Vcc of the driver IC. In FIG. 1, the second DC voltage source is illustrated as a battery that provides a voltage; however, it should be understood that the second DC voltage source may also be derived from an AC source.

The driver IC (switch controller) 130 is responsive to a timing resistance connected to a timing terminal Rt of the driver IC to alternately apply an upper drive voltage on an upper drive terminal Mupper of the driver IC and apply a lower drive voltage to a lower drive terminal Mlower of the driver IC. The upper output drive voltage is applied to the control input terminal of the first switch Q1. The lower output drive voltage is applied to the control input terminal of the second switch Q2. When the resistance applied to the timing terminal of the driver IC increases, the current I_Rt flowing out of the timing terminal decreases, which causes the operating frequency f_op of the drive voltages applied to the two switches to decrease. When the resistance applied to the timing terminal of the driver IC decreases, the current flowing out of the timing terminal increases, which causes the frequency of the drive voltages to increase. The frequency of the driver IC, as previously explained, is proportional to the output current of the timing terminal Rt of the driver IC, according to:

$$f\_op = K \cdot I\_Rt \qquad (1)$$

where K is a constant.

The driver IC may include other terminals such as, for example, a ground terminal GND coupled to the primary circuit ground reference GND_p.

The common switched node 112 of the half-bridge switching circuit 110 is connected to a half bridge connection terminal HB of the driver IC 130. The common switched node is also connected to a first terminal of a resonant inductor L1 in a resonant circuit 140. A second terminal of the resonant inductor is connected to a first terminal of a resonant capacitor C1 at an output node 142 in the resonant circuit. A second terminal of the resonant capacitor is connected to the primary circuit ground reference GND_p. The resonant inductor and the resonant capacitor are the main resonant components of the resonant circuit, which is driven by the alternatingly connecting the common switched node to the DC bus V_rail via the first switch Q1 and to the primary circuit ground reference via the second switch Q2.

The output node 142 of the resonant circuit 140 is connected to a first terminal of a DC blocking capacitor C2. A second terminal of the DC blocking capacitor is connected to a first terminal 152 of a primary winding Tp of an output isolation transformer 150. A second terminal 154 of the primary winding of the output isolation transformer is connected to the primary circuit ground reference GND_p. The foregoing components on the primary circuit 102 of the half-bridge switching circuit 110 operate as a DC to AC inverter to produce an AC voltage across the primary winding of the output isolation transformer.

The output isolation transformer 150 includes a first secondary winding Ts1 and a second secondary winding Ts2. The two secondary windings are electrically isolated from the primary winding Tp. As illustrated, the primary winding is electrically part of the primary circuit 102, and the secondary windings are electrically part of the secondary circuit 104. The two secondary windings have respective first terminals, which are connected at a center tap 160. The center tap may also be referred to herein as a common node. Respective second terminals 162, 164 of the first and second secondary windings are connected to input terminals of a half-bridge rectifier 170. The half-bridge rectifier comprises a first rectifier diode D1 and a second rectifier diode D2. The second terminal of the first secondary winding is connected to the anode of the first rectifier diode. The second terminal of the second secondary winding is connected to the anode of the second rectifier diode. The cathodes of the two rectifier diodes are connected together at an output node 172 of the half-bridge rectifier. The center tap of the first and second secondary windings is connected to a secondary circuit ground reference GND_s. The first and second diodes of the half-bridge rectifier rectify the AC voltage on the first and second secondary windings into a DC voltage. In other embodiments having a single, non-center-tapped secondary winding, the half-bridge rectifier with the two rectifier diodes may be replaced with a full-bridge rectifier with four rectifier diodes.

The output node 172 of the half-bridge rectifier 170 is connected to a first terminal of an output filter capacitor C3. A second terminal of the output filter capacitor is connected to the secondary circuit ground reference GND_s. An output voltage V_out is developed across the output filter capacitor at the output node of the half-bridge rectifier. The output node of the half-bridge rectifier is also connected to a first terminal of a load 180, which may comprise, for example, one or more light-emitting didoes (LEDs) that emit light when sufficient current passes through the LEDs. A second terminal of the load is connected to a current sensing node 182 and to the first terminal of a current sensing resistor R_I_sense. A second terminal of the current sensing resistor is connected to the secondary circuit ground reference. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the load current is insignificant.

When the driver IC 130 operates to apply alternating drive voltages to the first switch Q1 and the second switch Q2, an AC voltage develops across the resonant capacitor C1. The voltage across the resonant capacitor may include a DC component; however, the DC blocking capacitor C2 transfers only the AC component of the energy stored in the resonant capacitor to the primary winding Tp of the output isolation transformer 150. The transferred energy is magnetically coupled from the primary winding to the electrically isolated first and second secondary windings Ts1, Ts2. The first and second rectifier diodes D1, D2 in the half-bridge rectifier 170 rectify the AC energy from the secondary windings into DC energy, which is provided on the output node 172. The DC energy is stored in the output filter capacitor C3 at a voltage determined by the amount of stored energy. Current from the output filter capacitor is provided to the load 180 at a magnitude determined by the voltage on the half-bridge rectifier output node and the resistance of the load.

Because the intensity of the light emitted by the LEDs in the load 180 is dependent on the magnitude of the current flowing through the LEDs, the current is controlled closely. The current sensing resistor R_I_sense senses the current going through the load and develops a voltage V_I_sense on the current sensing node 182 proportional to the load current. The voltage representing the sensed current is fed back to a feedback circuit 190 to provide current regulation. The load voltage is to be maintained substantially constant across differing loads.

The feedback circuit 190 configured to regulate the output current provided to the load 180 at a reference current I_ref. The reference current may also be referred to herein as a reference signal. The feedback circuit includes an operational amplifier (OPAMP) 192 having an inverting (−) input terminal, having a non-inverting (+) input terminal, and having an output (OUT) on an output terminal 194. The current sensing node 182 is connected to the inverting input terminal of the OPAMP via a series resistor R3. A feedback resistor R4 and a feedback capacitor C4 are connected in series between the output terminal and the inverting input terminal of the OPAMP. The series resistor and the feedback resistor determine the proportional gain of the feedback circuit. The series resistor and the feedback capacitor determine the crossover frequency of the feedback circuit. The reference current is connected to the non-inverting input terminal of the OPAMP.

The magnitude of the reference current I_ref is selected to produce a desired output current through the load 180. The reference current may be a fixed reference current to provide a constant output current to the load. As indicated above, the output current is maintained constant relative to the reference current. If the reference current changes to a new magnitude, the output current is maintained constant relative to the new magnitude. The operational amplifier is responsive to a difference in the magnitudes of the reference current and current through the current sensing resistor R_I_sense to generate an error signal V_error. The error signal is used to control the operational frequency of the driver IC 130 as described below. The operational amplifier may also be considered as a comparator because the operational amplifier compares the magnitudes of the two input signals and generates an output signal having a magnitude responsive to a difference between the magnitudes of the two input signals.

The output (i.e., the error signal V_error) from the OPAMP 192 drives a frequency control block 196 through a series resistor R5. At least the feedback circuit and the frequency control block may define a proportional and integration (IP) loop, which may also be referred to herein as a control loop. The frequency control block injects (or outputs) a current I_inject between a first resistor R1 and a second resistor R2 coupled in series between timing terminal Rt of the IC 130 and the primary side ground reference GND_p. The current output from the frequency control block, controlled by the error signal V_error from the OPAMP, is used to control the current I_Rt flowing out of the timing terminal for controlling the operating frequency fop applied the drive voltages applied to the two switches so that the total control loop is closed.

The relationship between the output (I_inject) of the frequency control block 196 and its input (i.e., the error signal V_error) from the OPAMP 190 is as follows:

$$I\_inject = G \times V\_error \quad (2)$$

where G is a gain constant. Accordingly, the current I_inject is proportional to the error signal V_error.

According to the superposition principal, the current I_Rt flowing out of the timing terminal Rt can be calculated as follows:

$$I\_Rt = \frac{V\_ref}{R1 + R2} - \frac{I\_inject \times R2}{R1 + R2} = \frac{V\_ref}{R1 + R2} - \frac{G \times V_{error} \times R2}{R1 + R2} \quad (3)$$

By substituting current I_Rt flowing out of the timing terminal Rt into equation (1), the following equation is produced:

$$f\_op = K \cdot I\_Rt = K \times \left( \frac{V\_ref}{R1 + R2} - \frac{G \times V\_error \times R2}{R1 + R2} \right) \quad (4)$$

From equation (4) it can be noted that as the error signal V_error increases, the operating frequency f_op decreases; and as the error signal V_error decreases, the operating frequency f_op increases.

Figure 2:
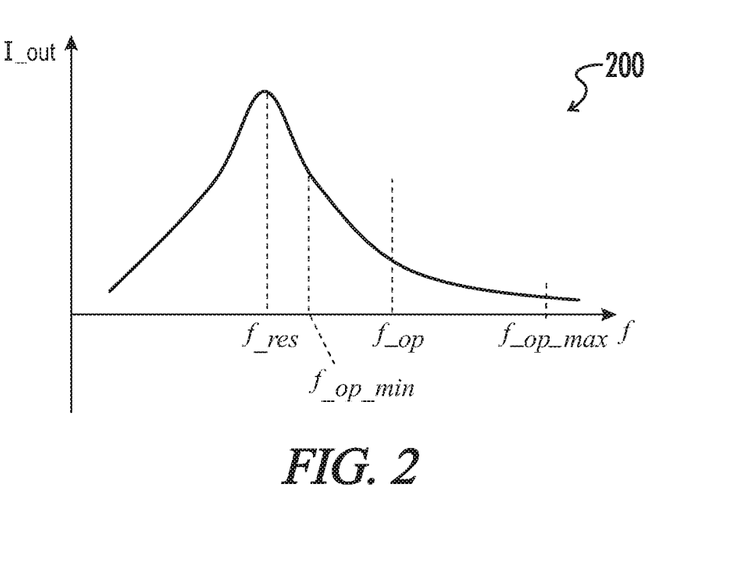
FIG. 2 is a graph representing the relationship between the operating frequency and the output current of the power converter of FIG. 1 as disclosed herein.

The relationship between the operating frequency fop and the output current I_out provided to the load 180 for a constant output voltage V_out is illustrated by a graph 200 in FIG. 2. The current control sequence follows below: (1) when output current provided to the load is less than the reference current I_ref, the output (I_inject) of the frequency control block 196 will increase, and in response the operating frequency fop will decrease according to the analysis above, which will cause the output current to increase; and (2) when output current provided to the load is more than the reference current, the output of the frequency control block will decrease, and in response the operating frequency will increase according to the analysis above, which will cause the output current to decrease.

Figure 3A:
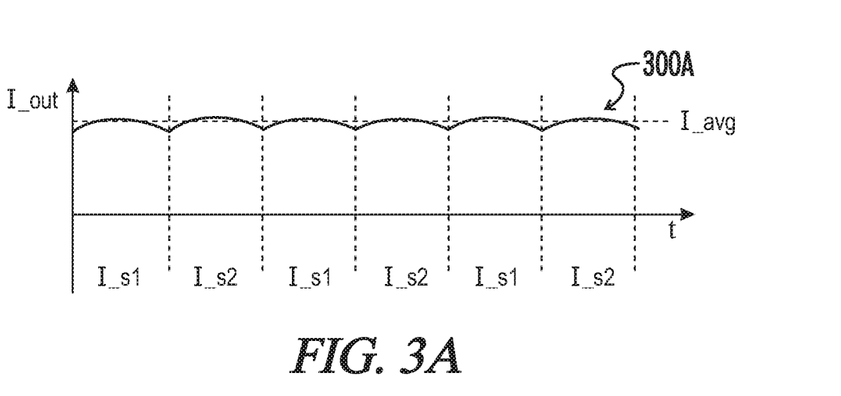
FIG. 3A is a graph of the output current corresponding to an ideal steady state operation of the power converter of FIG. 1 as disclosed herein.
Figure 3B:
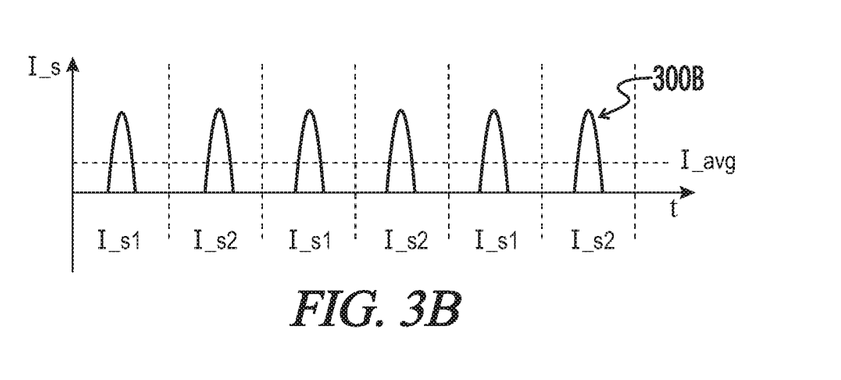
FIG. 3B is a graph representing first and second secondary winding currents through the first and second secondary windings corresponding to the output current of FIG. 3A as disclosed herein.

Referring to FIGS. 3A and 3B, an ideal steady state operation of the power converter 100 is shown, namely by a graph 300A, in FIG. 3A, of the output current I_out and a graph 300B, in FIG. 3B, of the first and second secondary winding currents I_s1, I_s2 through the first and second secondary windings Ts1, Ts2. As illustrated in FIG. 3A, the output current has a small high frequency (HF) AC ripple with a controlled target about an average output current I_avg. As illustrated in FIG. 3B, the first and second secondary winding currents should be very similar for every conduction cycle. Furthermore, the total secondary current also has the same average DC current as the average output current.

Figure 4A:
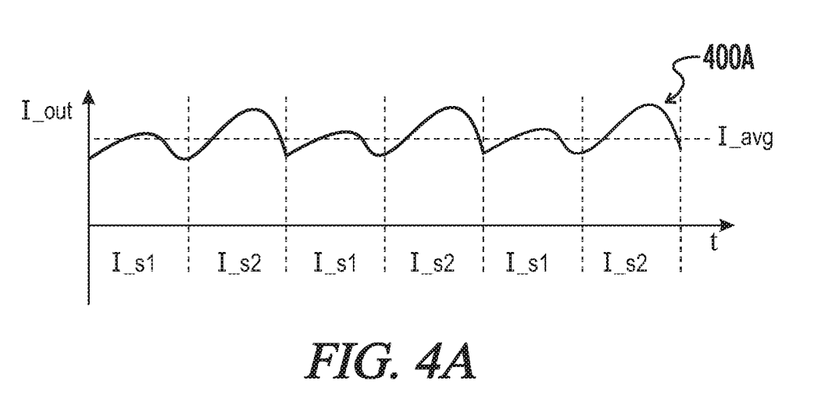
FIG. 4A a graph illustrating a high frequency asymmetric ripple of the output current of the power converter of FIG. 1 corresponding to a high current, low voltage load as disclosed herein.
Figure 4B:
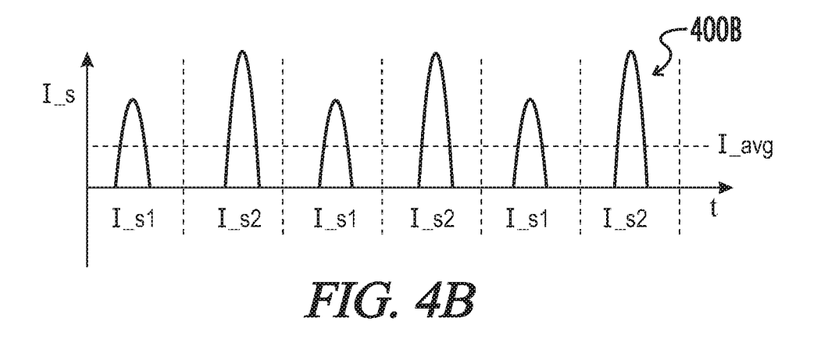
FIG. 4B is a graph representing first and second secondary winding currents through the first and second secondary windings corresponding to the output current of FIG. 3A as disclosed herein.

Referring to FIGS. 4A and 4B, a graph 400A, shown in FIG. 4A, of the output current I_out and a graph 400B, in FIG. 4B, of the first and second secondary winding currents I_s1, I_s2 through the first and second secondary windings Ts1, Ts2 for a high output current, for example, 2 A with a 45V load 180, is shown. As illustrated in FIG. 4A, the output current shows a strange asymmetric high frequency (HF) AC ripple. This HF AC ripple may affect the control loop stability and cause low frequency output flickering of the load. As illustrated in FIG. 4B, the first and second secondary winding currents become asymmetric. The reason this asymmetry happens is because each of the first and second secondary windings have unequal leakage inductances and the propensity of LEDs (e.g., the load) to have a very low dynamic AC impedance at a high output current and low output voltage.

Figure 5:
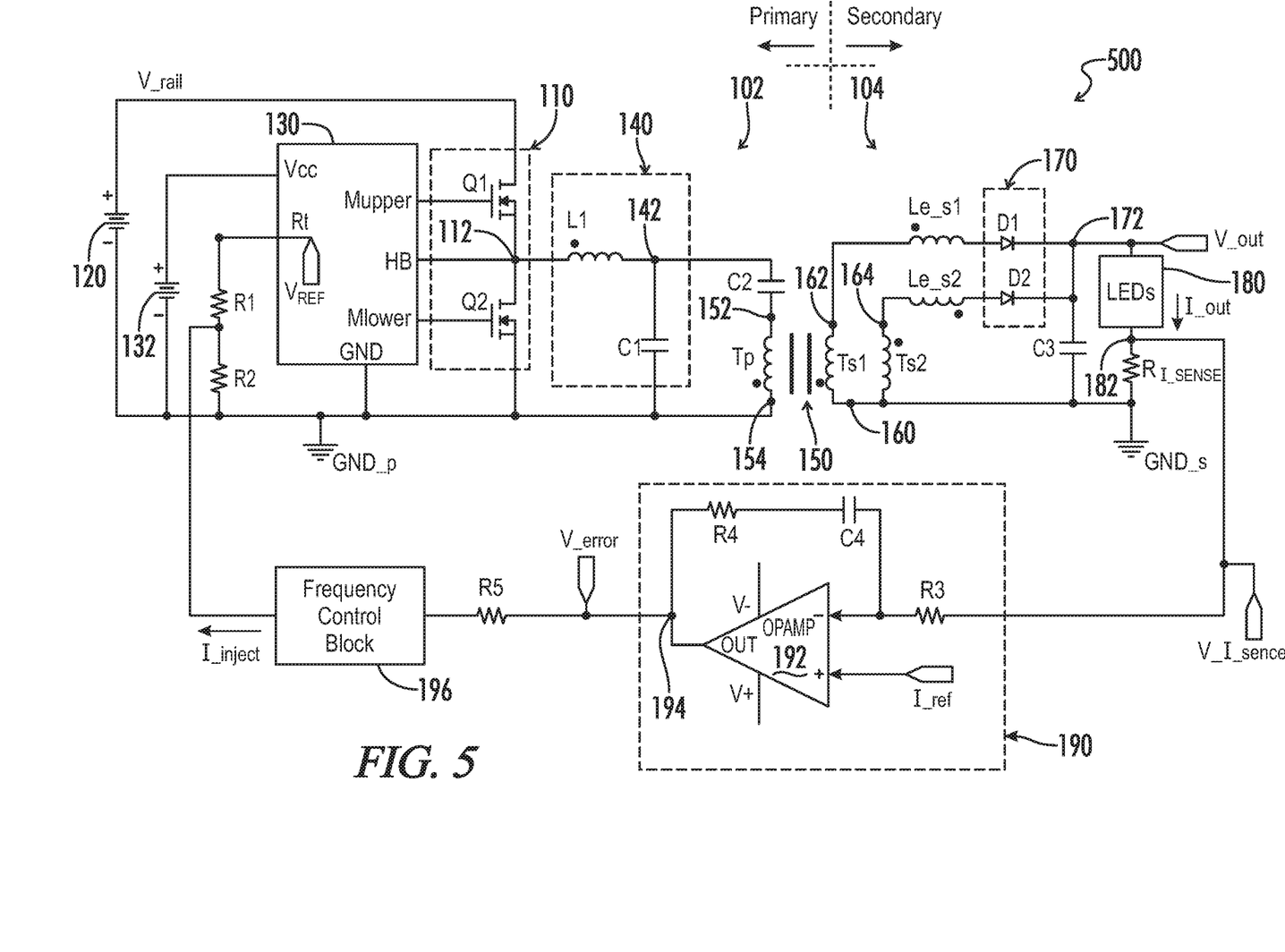
FIG. 5 is circuit diagram of the power converter of FIG. 1 including representations of leakage inductances of the first and second secondary windings of the power converter as disclosed herein.

Referring to FIG. 5, a power converter 500 is illustrated taking into account the leakage inductances of the first and second secondary windings Ts1, Ts2. The power converter 500 of FIG. 5 has certain components corresponding to components in the power converter 100, which operate in the same or similar manner. The corresponding components are identified with the same reference numbers in FIG. 5 as in FIG. 1.

Every transformer has a leakage inductance. The first secondary winding Ts1 of the transformer 150 includes a first leakage inductance Le_s1 illustrated in series between the first secondary winding and the first rectifier diode D1. The second secondary winding Ts2 of the transformer includes a second leakage inductance Le_s2 illustrated in series between the second secondary winding and the second rectifier diode D2. The first leakage inductance is obtained by shorting the primary winding Tp and then measuring the inductance of the first secondary winding. The second leakage inductance is obtained by shorting the primary winding and then measuring the inductance of the second secondary winding. The difference between the first leakage inductance and the second leakage inductance indicates how tightly the first and second secondary windings are inductively coupled. Because inherent differences are present due to the physical construction of the windings, the leakage inductance between different windings will not be equal. Accordingly, the first leakage inductance is not equal to the second leakage inductance.

Figure 6:
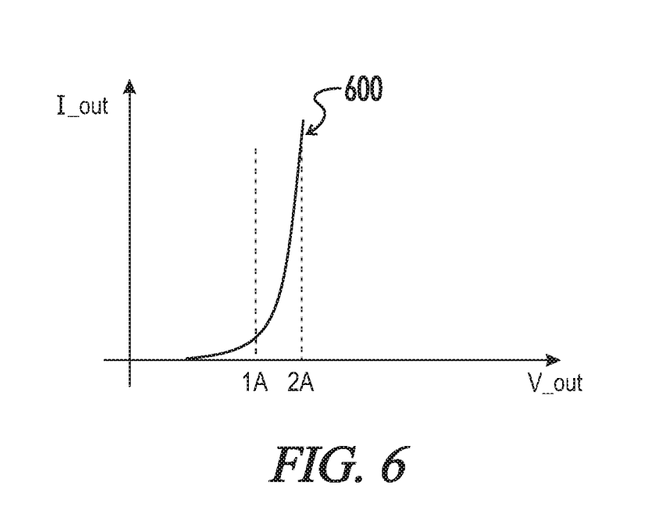
FIG. 6 is graph of the output current versus the output voltage of the power converter of FIG. 5 as disclosed herein.

Referring to FIG. 6, a graph 600 of the output voltage V_out and the output current Lout relationship is shown.

The dynamic AC impedance R_load_ac of the load 180 at a certain current level I_DC is defined as:

$$R\_load\_AC = \frac{dV}{dI} @ I\_DC \qquad (5)$$

As illustrated in FIG. 6, the impedance for the load 180 (e.g., an LED) at 2A is much smaller than at 1A. A lower output voltage corresponds to a fewer number of LEDs that may be connected in series at the output of the secondary circuit 102. Accordingly, a higher output current I_out and a smaller output voltage V_out corresponds to a smaller AC dynamic impedance of the load.

Figure 7:
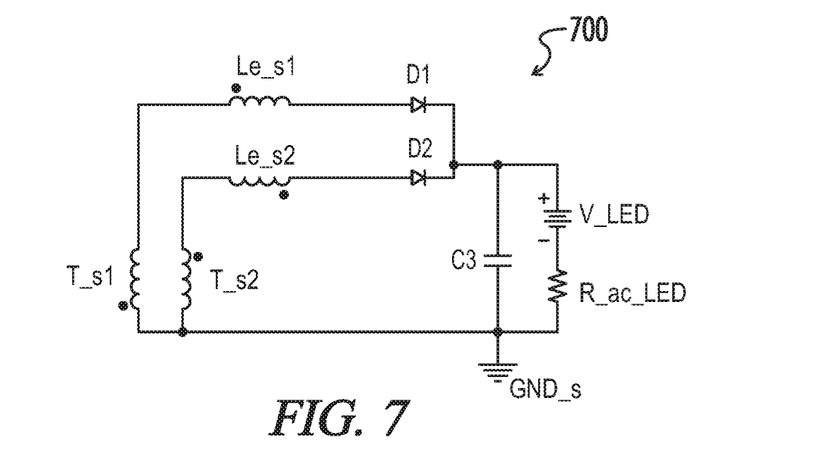
FIG. 7 is a circuit diagram of an equivalent secondary circuit corresponding to a secondary circuit of the power converter of FIG. 5 as disclosed herein.

Referring to FIG. 7, an equivalent secondary circuit 700 corresponding to an output current ripple difference for different LED loads R_ac_LED is shown. The load 180 and the current sensing resistor R_I_sense of the power converter 500 of FIG. 5 are replaced with an LED voltage V_LED corresponding to the voltage of the LED load and an impedance of the LED load. The remaining similar components of the equivalent secondary circuit are numbered and function similar to those of the secondary circuit 104 of the power converter of FIG. 5.

As illustrated in FIG. 7, all of the DC current will go through the LED load R_ac_LED since the output filter capacitor C3 doesn't allow any DC to pass through. The output filter capacitor, however, can filter out some of the high frequency AC ripple current.

When the output current Lout is low, the AC impedance of the LED load R_ac_LED will be large, accordingly, most of the AC ripple will be filtered out by the output filter capacitor C3 since the high frequency impedance of the output filter capacitor is smaller than that of the LED load. As a result, even when the first and second secondary currents I_s1, I_s2 through the first and second secondary windings Ts1, Ts2 are asymmetric, the high frequency AC ripple will be negligibly small, as shown in FIG. 3A. This small current ripple is not enough to cause any control loop stability issues.

When the output current Lout, however, is high, the AC impedance of the LED load R_ac_LED will be small, comparable to that of the output filter capacitor C3. As a result, much of the high frequency AC ripple will go through the LED load. In this situation, if the first and second secondary currents I_s1, I_s2 through the first and second secondary windings Ts1, Ts2 is not symmetric, then the AC ripple of the LED load will not be symmetric either, as shown in FIG. 4. The large asymmetric high frequency AC ripple on the LED load can corrupt the control loop stability and cause output current low frequency instability and visible flickering of the LED load.

It is possible to increase the value of the output filter capacitor C3 in order to provide additional filtering capability by using an electrolytic capacitor instead of a low equivalent series resistance (ESR) film capacitor. The large electrolytic capacitor, however, has a very large ESR which could cause overheating and reduce the lifetime of the capacitor.

From the above analysis, the root cause of the asymmetric high frequency AC ripple on the output current Lout is from the asymmetric the first and second secondary currents I_s1, I_s2 through the first and second secondary windings Ts1, Ts2. Balancing the AC currents on the first and secondary windings may help cause the high frequency AC ripple to be symmetric each cycle so that the control loop will be less sensitive to the high frequency AC ripple currents.

As shown in FIGS. 3 and 4, the first and second secondary currents I_s1, I_s2 through the first and second secondary windings Ts1, Ts2 are not continuous. The first and second secondary currents only occur for a short period for each half-cycle. The reason for this is that the load 180 (e.g., the output LED) is very similar to a constant voltage source. The first and second rectifier diodes D1, D2 only conduct current when first and second secondary winding voltages V_s1, V_s2 of the first and second secondary windings are greater than the LED voltage V_LED, as shown in FIGS. 8A and 8B.

Figure 8A:
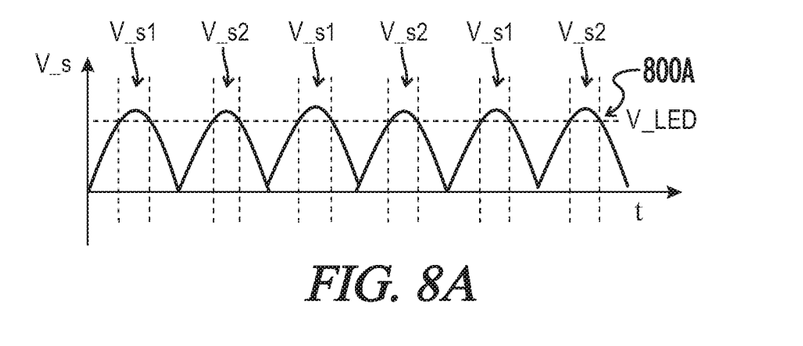
FIG. 8A is a graph of the first and second secondary winding voltages of the first and second secondary windings of the equivalent secondary circuit of FIG. 7 as disclosed herein.
Figure 8B:
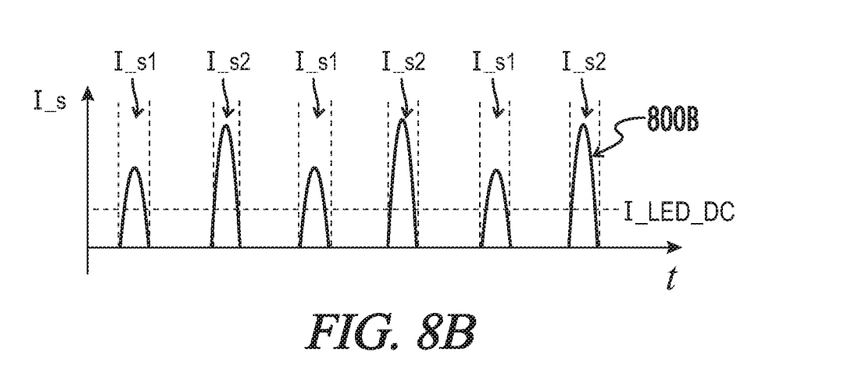
FIG. 8B is graph of the first and second secondary winding currents of the first and second secondary windings of the equivalent secondary circuit of FIG. 7 as disclosed herein.

As illustrated in FIG. 8A, a graph 800A of the first and second secondary winding voltages V_s1, V_s2 of the first and second secondary windings Ts1, Ts2 is shown. The average voltage of the first and second secondary winding voltages may be equal to the LED voltage V_LED. As illustrated in FIG. 8B, a graph of the first and second secondary winding currents I_s1, I_s2 of the first and second secondary windings is shown. The average current of the first and second secondary currents may be equal to the LED current I_LED_DC.

Figure 9:
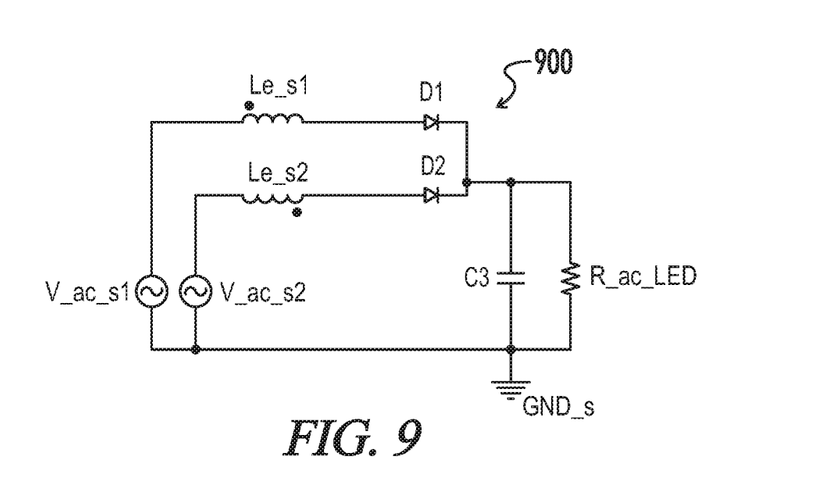
FIG. 9 is a circuit diagram of an AC equivalent circuit corresponding to a secondary circuit of the power converter of FIG. 5 as disclosed herein.

Referring to FIG. 9, an equivalent secondary circuit 900 corresponding to winding AC currents is shown. The winding AC currents can be approximately calculated using first and second secondary AC winding voltages V_ac_s1, V_ac_s2. The remaining similar components of the equivalent secondary circuit are numbered and function similar to those of the equivalent secondary circuit 700 of the power converter of FIG. 7.

The first and second secondary AC winding voltages V_ac_s1, V_ac_s2 correspond to when the first and second secondary winding voltages V_s1, V_s2 are greater than the LED voltage V_LED (e.g., the small portion above the LED voltage each half cycle). The total impedance of the output filter capacitor C3 and the LED load R_ac_LED may be smaller than the impedance of each of the first and second leakage inductance Le_s1, Le_s2 of the first and second secondary windings Ts1, Ts2. Accordingly, the total circuit AC impedance may be dominated by the first and second leakage inductances of the first and second secondary windings.

For example, if the first leakage inductance Le_s1 equals 2 uH, the second leakage inductance Le_s2 equals 3 uH, the capacitance of the output filter capacitor C3 equals 20 uF, the LED load R_ac_LED equals 0.5 ohm, and the operating frequency fop equals 70 KHz, then the impedance of the first leakage inductance equals 0.88 ohm, the impedance of the second leakage inductance equals 1.31 ohm, and the impedance of the output filter capacitor equals 0.11 ohm. As shown in the example, the impedance of each of the first and second leakage inductance is much higher than that of the output filter capacitor and the LED load in parallel.

Accordingly, the output filter capacitor C3 and the LED load R_ac_LED can be considered as a short circuit when approximating the first and second secondary winding currents I_s1, I_s2 through the first and second secondary windings Ts1, Ts2. The peaks (e.g., the first and second secondary winding current peaks I_s1_peak, I_s2_peak) of the first and second secondary winding currents can be approximated as:

$$I\_s1\_peak = \left| \frac{V\_ac\_s1}{j \times \omega \times Le\_s1} \right| \qquad (6)$$

$$I\_s2\_peak = \left| \frac{V\_ac\_s2}{j \times \omega \times Le\_s2} \right| \quad (7)$$

For example, if the first and second secondary AC winding voltages V_ac_s1, V_ac_s2 equal 3V, the operating frequency equals 70 KHz, the first leakage inductance Le_s1 equals 2 uH, and the second leakage inductance Le_s2 equals 3 uH, then equations (6) and (7) can be rewritten as follows:

$$I\_s1\_peak = \left| \frac{3}{j \times 2 \times 70000 \times 2 \times 10^{-6}} \right| = 3.412 \text{ A} \quad (8)$$

$$I\_s2\_peak = \left| \frac{3}{j \times 2 \times 70000 \times 3 \times 10^{-6}} \right| = 2.275 \text{ A} \quad (9)$$

From equations (8) and (9), it can clearly be seen that a slight difference between the first and second leakage inductances Le_s1, Le_s2 of the first and second secondary windings Ts1, Ts2 may cause a large difference between the first and second secondary winding current peaks I_s1_peak, I_s2_peak. This large difference between the winding currents may proportionally appear on the LED load R_ac_LED and cause control loop instability problems.

One solution for balancing the first and second secondary winding current peaks I_s1_peak, I_s2_peak from equations (6) and (7) is to add an impedance Z in the denominator of equations (6) and (7) as follows:

$$I\_s1\_peak = \left| \frac{V\_ac\_s1}{j \times \omega \times (Le\_s1 + Z)} \right| \quad (10)$$

$$I\_s2\_peak = \left| \frac{V\_ac\_s2}{j \times \omega \times (Le\_s2 + Z)} \right| \quad (11)$$

From equations (10) and (11), when the added impedance Z is large enough, in comparison to that of the first and second leakage inductances Le_s1, Le_s2, the first and second secondary winding current peaks I_s1_peak, I_s2_peak may no longer, or may at least be less sensitive to the difference between the first leakage inductance and the second leakage inductance.

When determining whether the impedance Z should be provided by a resistor, a capacitor, or an inductor, the following may be observed. A capacitor is a bad choice because DC cannot flow through a capacitor. A resistor is a bad choice because resistors have a high power loss. Based on these observations, impedance Z may be an inductor.

Figure 10:
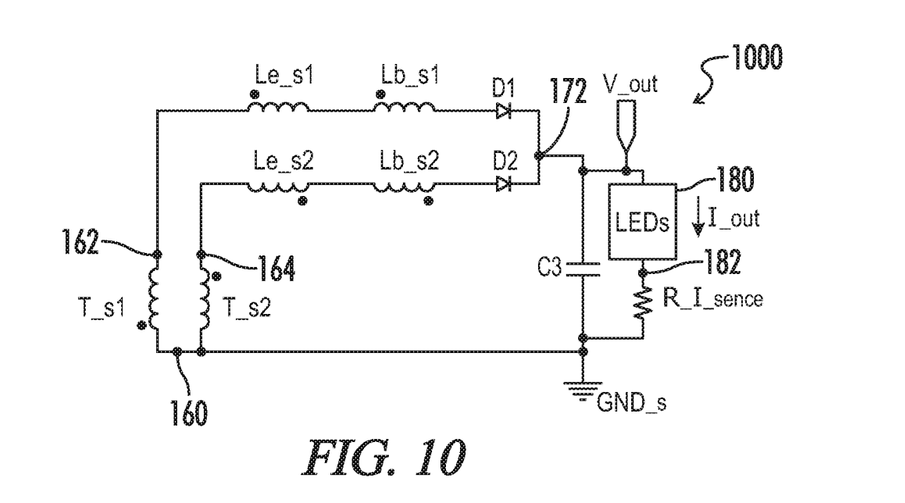
FIG. 10 is a circuit diagram of a first embodiment of a secondary circuit as disclosed herein.
Figure 11:
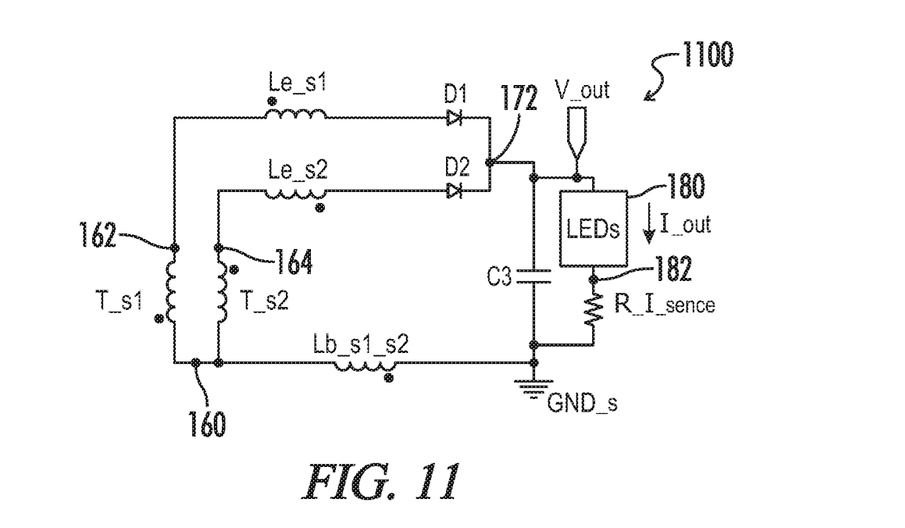
FIG. 11 is a circuit diagram of a second embodiment of a secondary circuit as disclosed herein.

Referring to FIG. 10, a first embodiment of a secondary circuit 1000 in accordance with the present disclosure is shown. Referring to FIG. 11, a second embodiment of a secondary circuit 1100 in accordance with the present disclosure is shown. Each embedment of the secondary circuit may replace the secondary circuit 104 of the power converters 100, 500, shown in FIGS. 1 and 5, respectively. Similar components of each of the secondary circuits 1000, 1100 are numbered and function similar to those of the secondary circuit 104 of each of the power converters 100, 500.

Each of the secondary circuits 1000, 1100 may include at least one balance inductor coupled in series with the first and second secondary windings Ts1, Ts2. The at least one balance inductor may be configured to reduce a difference between the first leakage inductance Le_s1 of the first secondary winding and the second leakage inductance Le_s2 of the second secondary winding. The at least one balance inductor may further be configured to reduce a difference between the first secondary winding current peak I_s1_peak and the second secondary winding current peaks I_s2_peak.

As illustrated in FIG. 10, the at least one balance indicator includes a first balance inductor Lb_s1 and a second balance inductor Lb_s2. The first balance inductor may be coupled between the first secondary winding Ts1 and the first rectifier diode D1. The second balance inductor may be coupled between he second secondary winding Ts2 and the second rectifier diode D2. The first and second balance indicators may be configured to cancel the difference between the first leakage inductance Le_s1 of the first secondary winding and the second leakage inductance Le_s2 of the second secondary winding, and may further be configured to balance the first and second secondary winding currents I_s1, I_s2 of the first and second secondary windings (e.g., by minimizing the between the first secondary winding current peak I_s1_peak and the second secondary winding current peaks I_s2_peak). The impedance of each of the first and second balance inductors may be selected such that the total impedance of each of the first and second secondary windings are approximately equal, as follows:

$$j \times \omega \times (Le\_s1 + Lb\_s1) = j \times \omega \times (Le\_s2 + Lb\_s2) \quad (12)$$

Alternatively, the impedance of each of the first and second balance inductors Lb_s1, Lb_s2 may be the same as long as the impedance of each inductor is large enough to cancel a majority of or at least a portion of the difference between the first leakage inductance Le_s1 of the first secondary winding Ts1 and the second leakage inductance Le_s2 of the second secondary winding Ts2.

As illustrated in FIG. 11, at least one balance indicator includes a single balance inductor Lb_s1_s2. The single balance inductor may achieve the same goal as the first and second balance inductors Lb_s1, Lb_s2 of FIG. 10 as long as the impedance or inductance of the single balance inductor is large enough to cancel or at least minimize the difference between the first leakage inductance Le_s1 of the first secondary winding Ts1 and the second leakage inductance Le_s2 of the second secondary winding Ts2.

Electrically, the single balance inductor Lb_s1_s2, as shown in FIG. 11, and the first and second balance inductors Lb_s1, Lb_s2, as shown in FIG. 10, are configured in series with the first and second secondary windings Ts1, Ts2. Accordingly, both embodiments may achieve the same goal. Furthermore, the single balance inductor of FIG. 11 is equivalent to the first and second balance inductors of FIG. 10 when their respective impedances are equal. While both embodiments may achieve the same goal, each of the first and second balance inductors conduct the current that the single balance inductor does, and as such they are easier to practically design a circuit around for minimizing the difference between the first leakage inductance Le_s1 of the first secondary winding and the second leakage inductance Le_s2 of the second secondary winding.

The following is an illustrative example of the effect of current balancing made possible by adding the at least one balance inductor in series with the first and second secondary windings Ts1, Ts2. Expounding from the example component values shown in equations (8) and (9), if the inductance of the single balance inductor Lb_s1_s2 is equal to 5 uH, or the inductance of each of the first and second balance inductors Lb_s1, Lb_s2 is the same and equal to 5 uH, then the first secondary winding current peak I_s1_peak and the second secondary winding current peaks I_s2_peak may be calculated as follows utilizing equations (10) and (11):

$$\text{I\_s1\_peak} = \left| \frac{3}{j \times 2 \times 70000 \times (2+5) \times 10^{-6}} \right| = 0.975 \text{ A} \quad (13)$$

$$\text{I\_s2\_peak} = \left| \frac{3}{j \times 2 \times 70000 \times (3+5) \times 10^{-6}} \right| = 0.853 \text{ A} \quad (14)$$

From equations (13) and (14), it can clearly be seen that the difference between the first secondary winding current peak I_s1_peak and the second secondary winding current peaks I_s2_peak is smaller than that of equations (8) and (9), which are associated with the secondary circuit 104 of the power converter 500 of FIG. 5.

The inductance of the at least one balance inductor may not be too large as that would limit the DC gain of the resonant circuit 140. The inductance value of the at least one balance inductor may be set as follows:

$$N\_ps^2 \times Lb\_s1\_s2 < 10\% \times Lp \quad (15)$$

$$N\_ps^2 \times Lb\_s1 < 10\% \times Lp \quad (16)$$

$$N\_ps^2 \times Lb\_s2 < 10\% \times Lp \quad (17)$$

where N_ps is the turns ratio between the primary winding Tp and at least one of the first and second secondary windings Ts1, Ts2. The turns ratio between the primary winding and each of the first and second secondary windings may be equal. Lp is the primary winding inductance.

Equations (15), (16), and (17) state that the reflected inductance from the secondary to the primary may be less than 10% of the primary winding inductance Lp so that the at least one balance inductor does not dramatically reduce the AC voltage across the primary winding Tp, which would result in a DC gain reduction.

The present disclosure, namely, the secondary circuits 1000, 1100, may be effective to improve stability of the output current I_out for a high output current LED driver or power converter. These circuit may further effectively stabilize and desensitize the control loop and eliminate flickering of the load 180.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power converter comprising:
    a primary circuit comprising one or more switching elements controllably driven at an operating frequency to produce an alternating current (AC) output through a primary winding of a transformer; and
    a secondary circuit comprising:
        first and second secondary windings of the transformer coupled together at a common node, the first secondary winding having a first leakage inductance, the second secondary winding having a second leakage inductance,
        wherein the secondary circuit configured to provide power at an output node based on a power transfer between the primary winding and the first and second secondary windings; and
        at least one balance inductor coupled in series with the first and second secondary windings between the common node and a ground reference of the secondary circuit, the at least one balance inductor configured to reduce a difference between the first leakage inductance and the second leakage inductance.

2. The power converter of claim 1, wherein:
    the first secondary winding has a first secondary winding current peak, and the second secondary winding has a second secondary winding current peak; and
    the at least one balance inductor is configured to reduce a difference between the first secondary winding current peak and the second secondary winding current peak.

3. The power converter of claim 1, wherein:
    an inductance of the at least one balance inductor is less than 10% of a primary inductance of the primary winding divided by a turns ratio between the primary winding and the first and second secondary windings squared.

4. The power converter of claim 1, wherein:
    the at least one balance inductor comprises a single balance inductor coupled to the common node.

5. The power converter of claim 1, wherein the load comprises one or more light emitting diodes (LEDs).

6. A power converter adapted for reduced asymmetric alternating current (AC) ripple on a direct current (DC) output current to a load, the power converter comprising:
    means for producing current through a primary winding of a power transformer, the primary winding magnetically coupled to first and second secondary windings of the power transformer, the first and second secondary windings coupled together at a common node; and means for balancing output currents through the first and second secondary windings of the power transformer, respectively, coupled between the common node and a ground reference.

7. The power converter of claim 6, wherein the load comprises one or more light emitting diodes (LEDs).

8. A power converter comprising:
 a primary circuit comprising one or more switching elements controllably driven at an operating frequency to produce an alternating current (AC) output through a primary winding of a transformer; and
 a secondary circuit comprising:
  first and second secondary windings of the transformer coupled together at a common node, the first secondary winding having a first secondary winding current peak, the second secondary winding having a second secondary winding current peak,
  wherein the secondary circuit configured to provide power across an output capacitor based on a power transfer between the primary winding and the first and second secondary windings; and
  at least one balance inductor coupled between the common node and the output capacitor, the at least one balance inductor configured to reduce a difference between the first secondary winding current peak and the second secondary winding current peak, wherein the at least one balance inductor is further coupled between the common node and a ground reference of the secondary circuit.

9. The power converter of claim 8, wherein the load comprises one or more light emitting diodes (LEDs).

\* \* \* \* \*